(12) United States Patent
Xia et al.

(10) Patent No.: US 12,393,699 B1
(45) Date of Patent: Aug. 19, 2025

(54) HIGH-TEMPORAL-ACCURACY ELECTROMAGNETIC FAULT INJECTION METHOD AND APPARATUS FOR CRYPTOGRAPHIC CHIP

(71) Applicants: CHINA AUTOMOTIVE TECHNOLOGY AND RESEARCH CENTER CO., LTD., Tianjin (CN); CHINA AUTOMOTIVE CHIP (SHENZHEN) TECHNOLOGY CO., LTD., Shenzhen (CN)

(72) Inventors: Xianzhao Xia, Tianjin (CN); Yujia Li, Tianjin (CN); Hanbing Wu, Tianjin (CN); Mingyang Li, Tianjin (CN); Rui Zhao, Tianjin (CN); Ruiqing Zhai, Tianjin (CN); Mingkai Yan, Tianjin (CN); Changqing Dong, Tianjin (CN); Hui Rong, Tianjin (CN); Lixiong Zhang, Tianjin (CN)

(73) Assignees: CHINA AUTOMOTIVE TECHNOLOGY AND RESEARCH CENTER CO., LTD., Tianjin (CN); CHINA AUTOMOTIVE CHIP (SHENZHEN) TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/006,173

(22) Filed: Dec. 30, 2024

(30) Foreign Application Priority Data

Sep. 6, 2024 (CN) .......................... 202411244330.5

(51) Int. Cl.
*G06F 21/57* (2013.01)
*H04L 9/00* (2022.01)

(52) U.S. Cl.
CPC ............ *G06F 21/577* (2013.01); *H04L 9/004* (2013.01); *G06F 2221/034* (2013.01)

(58) Field of Classification Search
CPC ... G06F 21/577; G06F 2221/034; H04L 9/004
See application file for complete search history.

(56) References Cited

U.S. PATENT DOCUMENTS

2021/0048466 A1* 2/2021 Xue ..................... G06F 21/75
2022/0129545 A1* 4/2022 Lim ..................... G06F 21/602
(Continued)

FOREIGN PATENT DOCUMENTS

CN 104965153 A 10/2015
CN 105391542 A 3/2016
(Continued)

OTHER PUBLICATIONS

Notification to Grant Patent Right for Invention issued in counterpart Chinese Patent Application No. 202411244330.5, dated Oct. 22, 2024.

*Primary Examiner* — Meng Li
(74) *Attorney, Agent, or Firm* — Westbridge IP LLC (57) ABSTRACT

Disclosed in the present application are a high-temporal-accuracy electromagnetic fault injection method and apparatus for a cryptographic chip. The method includes: adjusting fault injection time jointly according to peak time and rise time of an electromagnetic pulse signal, thereby enhancing the accuracy of controlling injection time, improving the analysis efficiency and effect of differential fault analysis, and increasing the success rate of the effective fault injection.

10 Claims, 3 Drawing Sheets

(56) References Cited

U.S. PATENT DOCUMENTS

2024/0275575 A1* 8/2024 Caullery ................ H04L 9/004
2025/0030535 A1* 1/2025 Caullery ................ H04L 9/004

FOREIGN PATENT DOCUMENTS

| CN | 107643481 A | | 1/2018 |
|---|---|---|---|
| CN | 117269740 A | | 12/2023 |
| CN | 118777844 A | * | 10/2024 |
| DE | 102017205954 A1 | | 10/2018 |

* cited by examiner

HIGH-TEMPORAL-ACCURACY ELECTROMAGNETIC FAULT INJECTION METHOD AND APPARATUS FOR CRYPTOGRAPHIC CHIP

CROSS-REFERENCE TO RELATED APPLICATIONS

This application claims priority to Chinese Patent Application No. 202411244330.5, filed on Sep. 6, 2024, the content of which is incorporated herein by reference in its entirety.

TECHNICAL FIELD

The present application relates to the technical fields of integrated circuit safety and electromagnetic fault injection, and in particular to a high-temporal-accuracy electromagnetic fault injection method and apparatus for a cryptographic chip.

BACKGROUND

Electromagnetic fault injection (EMFI) attacks a chip through a transient electromagnetic field generated on an electromagnetic probe. A transient electromagnetic pulse will produce transient induced voltage and current on the attacked chip so as to introduce an interference signal to the attacked chip, change a voltage and a logic value of a logic gate inside the chip, and cause failure when the chip works. Compared with other fault injection methods, the electromagnetic fault injection can accurately attack a local area of the chip through spatial positioning without touching the chip and removing chip packaging, so the electromagnetic fault injection has been widely concerned in recent years.

After fault injection is implemented, the attacker can extract circuit key information by using the injected fault and through differential fault analysis (DFA). DFA gradually deduces a key used in an encryption algorithm by comparing a correct ciphertext with an incorrect ciphertext (that is, a ciphertext obtained from incorrect encryption). The accuracy of DFA is related to the accuracy of the fault injection. The fault injection is time-sensitive. If a fault is not induced at an appropriate time in the algorithm or an incorrect bit is affected, the whole attack process fails. Therefore, temporal accuracy is a key factor for performing any fault attack.

To improve the injection efficiency of the electromagnetic fault injection and the accuracy of DFA, an existing method mainly focuses on reducing the encryption process and constructing a fault model. However, when the existing method adopts a fault injection mode based on a transient electromagnetic pulse, only a pulse peak moment is considered as the time of fault injection, and the influence of the rise time of a signal on the electromagnetic fault has not been considered. The fault injection mode based on the transient electromagnetic pulse is to generate a transient electromagnetic field by applying transient voltage pulse signals to two ends of a coil, so that transient induced voltage and current are introduced in a target chip, and the electromagnetic fault injection attack will fail when the temporal accuracy of the fault injection is insufficient. There is no effective method to solve the above problems at present.

Therefore, there is an urgent need for a high-temporal-accuracy electromagnetic fault injection method and apparatus for a cryptographic chip, so the fault injection time can be controlled more accurately, the analysis efficiency and effect of the differential fault analysis can be improved, and the success rate of the effective fault injection can be increased.

SUMMARY

To solve the above technical problems, the present application provides a high-temporal-accuracy electromagnetic fault injection method and apparatus for a cryptographic chip, so the fault injection time can be controlled more accurately, the analysis efficiency and effect of the differential fault analysis can be improved, and the success rate of the effective fault injection can be increased.

The present application provides a high-temporal-accuracy electromagnetic fault injection method for a cryptographic chip. The method is implemented based on an electromagnetic fault injection apparatus. The electromagnetic fault injection apparatus includes an upper computer, an XYZ-direction three-axis displacement platform, an electromagnetic pulse generator and an electromagnetic probe. The method includes the following steps:

placing a cryptographic chip to be attacked on the XYZ-direction three-axis displacement platform;

setting parameters of the electromagnetic fault injection apparatus by the upper computer, where the parameters include an intensity and a frequency of an electromagnetic pulse signal generated by the electromagnetic pulse generator, and a stepping speed and a moving step length of the XYZ-direction three-axis displacement platform;

performing initialization on the cryptographic chip to be attacked to by the upper computer, where the initialization includes power-on and plaintext input;

determining fault injection time of the electromagnetic fault injection apparatus according to peak time and rise time of the electromagnetic pulse signal generated by the electromagnetic pulse generator;

controlling the electromagnetic fault injection apparatus at the fault injection time to perform fault injection on a target position of the cryptographic chip to be attacked, where the fault injection performed on the cryptographic chip to be attacked includes a single fault injection and a continuous fault injection;

determining whether the fault injection is effective fault injection after completing one-time fault injection by the electromagnetic fault injection apparatus; if the fault injection is the effective fault injection, recording an effective incorrect ciphertext output by the cryptographic chip to be attacked under the fault injection, otherwise, skipping recording;

initializing the cryptographic chip to be attacked, and resetting the electromagnetic fault injection apparatus to change a plaintext input of the cryptographic chip to be attacked;

returning to the step of setting the parameters of the electromagnetic fault injection apparatus by the upper computer and re-performing the step until preset fault injection times are reached; and cracking key information of the cryptographic chip to be attacked by a differential fault analysis method according to effective incorrect ciphertexts output by the cryptographic chip to be attacked under different plaintexts.

The present application further provides a high-temporal-accuracy electromagnetic fault injection apparatus for a cryptographic chip, for implementing the high-temporal-accuracy electromagnetic fault injection method for a cryptographic chip according to any one of the above. The electromagnetic fault injection apparatus includes:

an upper computer, configured to control and operate each device in the electromagnetic fault injection apparatus and communicate with a cryptographic chip to be attacked through a serial port;

an electromagnetic pulse generator, connected to the upper computer and configured to generate a pulse signal;

an electromagnetic probe, connected to the electromagnetic pulse generator and the cryptographic chip to be attacked and configured to generate a high-voltage transient electromagnetic field so as to generate transient induced voltage and current in the cryptographic chip to be attacked; and an XYZ-direction three-axis displacement platform, connected to the upper computer and configured to accurately adjust relative positions of the electromagnetic probe and the cryptographic chip to be attacked.

The embodiments of the present application have the following technical effects:

according to the present application, it is considered that the electromagnetic pulse signal cannot reach a peak value due to the rise time, the cryptographic chip to be attacked can be attacked only when the electromagnetic pulse signal reaches the peak value, and the rise slope and the rise time of the electromagnetic pulse signal are also different when the injection intensities of the electromagnetic pulse are different; therefore according to the present application, the fault injection time is adjusted jointly according to the peak time and the rise time of the electromagnetic pulse signal, so that the accuracy of the injection time is enhanced, the analysis efficiency and effect of the differential fault analysis are improved, and the success rate of the effective fault injection is increased; in addition, it is also considered that the electromagnetic pulse signal has the rise time and the fall time during continuous fault injection, the injection cycle is adjusted jointly according to the rise time, the fall time and the delay time, thereby further enhancing the accuracy of controlling the injection time, improving the analysis efficiency and effect of the differential fault analysis, and increasing the success rate of the effective fault injection.

BRIEF DESCRIPTION OF THE DRAWINGS

To more clearly describe the technical solutions of the specific embodiments of the present application or in the prior art, the accompanying drawings required to describe the specific embodiments or the prior art are briefly described below. Apparently, the accompanying drawings described below are some embodiments of the present application. Those of ordinary skill in the art may further obtain other accompanying drawings based on these accompanying drawings without inventive effort.

DETAILED DESCRIPTION OF THE EMBODIMENTS

To make the objective, technical solutions and advantages of the embodiments of the present application clearer, the technical solutions of the present application will be clearly and completely described below. Apparently, the embodiments described are merely some embodiments rather than all embodiments of the present application. Based on the embodiments of the present application, all other embodiments obtained by those of ordinary skill in the art without creative efforts shall fall within the protection scope of the present application.

Figure 1:
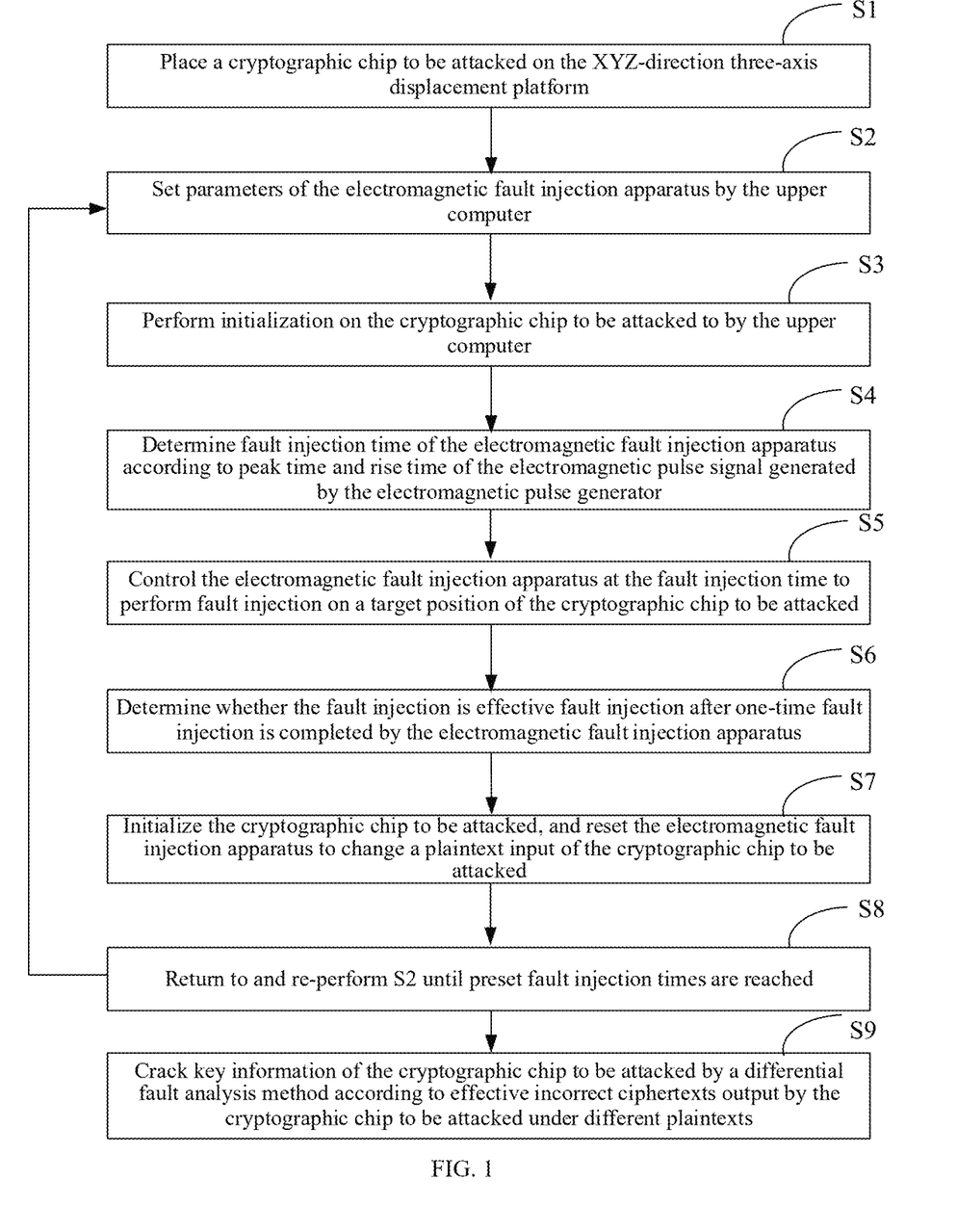
FIG. 1 is a flowchart of a high-temporal-accuracy electromagnetic fault injection method for a cryptographic chip according to an embodiment of the present application.

The present application provides a high-temporal-accuracy electromagnetic fault injection method for a cryptographic chip. The method is implemented based on an electromagnetic fault injection apparatus. The electromagnetic fault injection apparatus includes an upper computer, an XYZ-direction three-axis displacement platform, an electromagnetic pulse generator and an electromagnetic probe. FIG. 1 is a flowchart of a high-temporal-accuracy electromagnetic fault injection method for a cryptographic chip according to an embodiment of the present application. Referring to FIG. 1, the method specifically includes:

S1: a cryptographic chip to be attacked is placed on the XYZ-direction three-axis displacement platform.

Specifically, a contact pad inside a smart card chip effectively shields most of the magnetic flux, so when the cryptographic chip to be attacked is the smart card chip, the smart card chip with the back upward is placed on the XYZ-direction three-axis displacement platform of the electromagnetic fault injection apparatus.

An electromagnetic field can easily pass through plastic package or epoxy resin package outside an embedded chip, so when the cryptographic chip to be attacked is the embedded chip, the embedded chip with the front upward is placed on the XYZ-direction three-axis displacement platform of the electromagnetic fault injection apparatus.

S2: parameters of the electromagnetic fault injection apparatus are set by the upper computer.

The parameters include an intensity and a frequency of an electromagnetic pulse signal generated by the electromagnetic pulse generator, and a stepping speed and a moving step length of the XYZ-direction three-axis displacement platform. The intensity of the electromagnetic pulse signal is the intensity of the fault injection. The stepping speed and the moving step length of the XYZ-direction three-axis displacement platform are set according to the size of the cryptographic chip to be attacked. The larger the size of the cryptographic chip to be attacked, the lower the stepping rate of the XYZ-direction three-axis displacement platform, and the smaller the moving step length.

S3: initialization is performed on the cryptographic chip to be attacked by the upper computer.

Specifically, the initialization includes power-on and plaintext input.

Further, a correct ciphertext output by the cryptographic chip to be attacked is obtained, that is, a ciphertext output when the cryptographic chip to be attacked is not subjected to fault injection; and a plaintext input can be encrypted into an output plaintext by an encryption algorithm.

S4: fault injection time of the electromagnetic fault injection apparatus is determined according to peak time and rise time of the electromagnetic pulse signal generated by the electromagnetic pulse generator.

Specifically, an intensity of the electromagnetic pulse signal generated by the electromagnetic pulse generator is determined.

Figure 2:
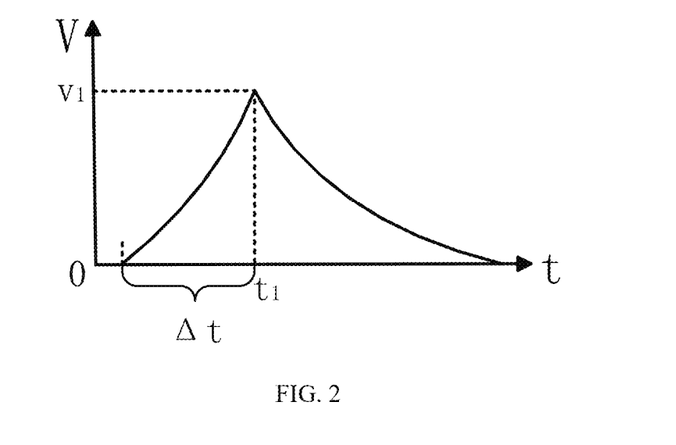
FIG. 2 is a schematic diagram of an electromagnetic pulse signal waveform of single fault injection according to an embodiment of the present application.

FIG. 2 is a schematic diagram of an electromagnetic pulse signal waveform of single fault injection according to an embodiment of the present application. Referring to FIG. 2, the peak time $t_1$ of the electromagnetic pulse signal is determined according to a moment when a trigger signal is pulled up in the last round of encryption operation of the cryptographic chip to be attacked, and the rise time $\Delta t$ of the electromagnetic pulse signal is determined according to the intensity of the electromagnetic pulse signal.

The fault injection time $(t_1-\Delta t)$ of the electromagnetic fault injection apparatus is determined according to a difference between the peak time and the rise time of the electromagnetic pulse signal.

Figure 4:
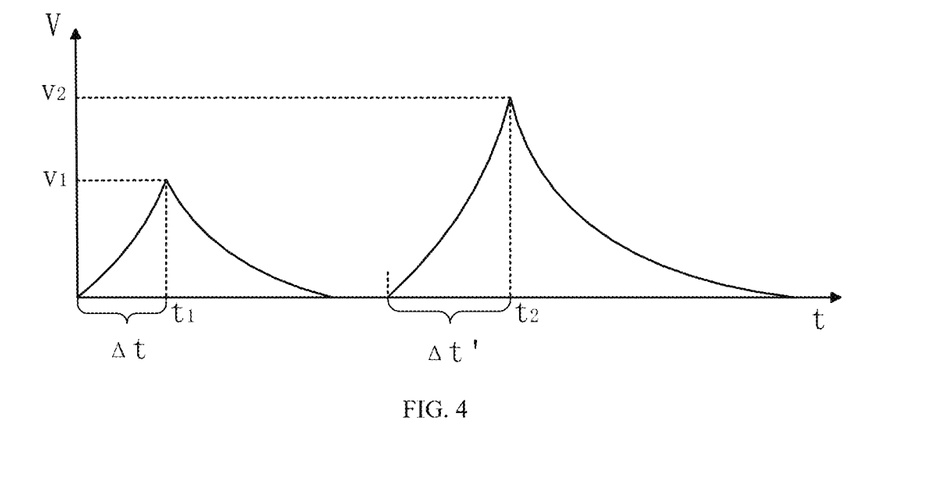
FIG. 4 is a schematic diagram of an electromagnetic pulse signal waveform of single fault injection under different intensities of electromagnetic pulse signals according to an embodiment of the present application.

Further, FIG. 4 is a schematic diagram of an electromagnetic pulse signal waveform of single fault injection under different intensities of electromagnetic pulse signals according to an embodiment of the present application. Referring to FIG. 4, when the intensity of the electromagnetic pulse signal generated by the electromagnetic pulse generator is different, the peak time of the electromagnetic pulse signal, the slope of the electromagnetic pulse signal and the rise time of the electromagnetic pulse signal will change, so it is necessary to adjust the fault injection time in real time according to the intensity of the electromagnetic pulse signal.

Further, the fault injection performed on the cryptographic chip to be attacked includes a single fault injection and a continuous fault injection.

Figure 3:
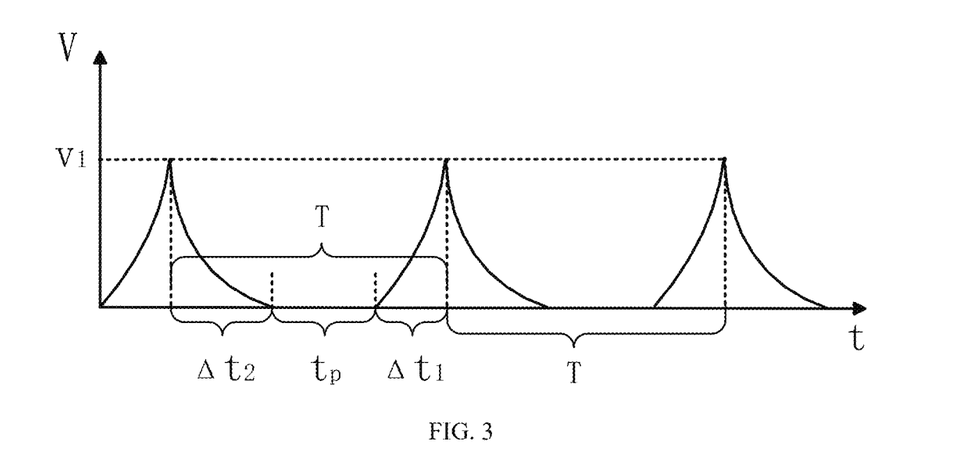
FIG. 3 is a schematic diagram of an electromagnetic pulse signal waveform of continuous fault injection according to an embodiment of the present application.

Further, FIG. 3 is a schematic diagram of an electromagnetic pulse signal waveform of continuous fault injection according to an embodiment of the present application.

Referring to FIG. 3, when the fault injection performed by the cryptographic chip to be attacked is the continuous fault injection, after the step S4, the method further includes:

fall time $\Delta t_2$ of the electromagnetic pulse signal is determined according to the intensity of the electromagnetic pulse signal.

An injection cycle T of the continuous fault injection is determined according to the rise time $\Delta t_1$, the fall time $\Delta t_2$ and preset delay time $t_p$ of the electromagnetic pulse signal. The preset delay time $t_p$ can be set according to the actual situation. During the continuous fault injection, it is necessary to perform initialization operation on the cryptographic chip to be attacked within the preset delay time $t_p$.

The injection cycle is the sum of the rise time, the fall time and the preset delay time of the electromagnetic pulse signal.

S5: the electromagnetic fault injection apparatus is controlled at the fault injection time to perform fault injection on a target position of the cryptographic chip to be attacked.

Specifically, a method for determining the target position includes;

an electromagnetic sensitivity test is performed on the cryptographic chip to be attacked to obtain an electromagnetic sensitivity of each position on the cryptographic chip to be attacked; and the position corresponding to a maximum electromagnetic sensitivity is selected as the target position of the cryptographic chip to be attacked.

Specifically, since the electromagnetic injection has localization effect, the results obtained by performing fault injection at different positions are different. To interfere with the normal work of the cryptographic chip to be attacked to a great extent, it is necessary to generate a strong magnetic field as much as possible in a vulnerable area of the cryptographic chip to be attacked. The vulnerable area is an area with high electromagnetic sensitivity, so the effect of performing electromagnetic fault injection on the vulnerable area is better. For example, the vulnerable area may be an interconnected line, a storage unit, a clock circuit and the like.

Further, the principle of performing fault injection on a target position of the cryptographic chip to be attacked by the electromagnetic fault injection apparatus is as follows:

the electromagnetic pulse generator is turned on, and a variable electromagnetic field is generated by a coil. The number of turns in a coil is N, the surface area of the coil is S, the current flowing through the coil is I, the magnetic field induction intensity generated by the coil is B, and the included angle between the surface of the coil and the magnetic field line is θ, then the magnetic flux $\varphi_B$ of the coil is expressed as:

$\varphi_B = BS \cos \theta$.

The magnetic conductivity of a medium in the coil is μ, the radius of the coil is r, and the distance from the circle center of the coil to the point on the axis is z, then the magnetic induction intensity of a point on the axis of the coil may be expressed as:

$$B = \frac{\mu_r I r^2}{2(r^2+z^2)^{\frac{3}{2}}}.$$

When the coil is close to the target chip, according to the law of electromagnetic induction, an induced electromotive force generated in the target chip may be expressed as:

$$\varepsilon = N \frac{d\varphi_B}{dt} = N \frac{d(BS \cos \theta)}{dt}.$$

$\varphi_B$ and B are brought into the above formula to obtain:

$$\varepsilon = N \frac{d(BS \cos \theta)}{dt} = NS \cos \theta \frac{dB}{dt} = NS \cos \theta \frac{\mu_r r^2}{2(r^2+z^2)^{\frac{3}{2}}} \frac{dI}{dt}.$$

That is, electromagnetic fault injection enables the cryptographic chip to be attacked to generate the induced electromotive force so as to change a logic value. The induced electromotive force is an electromotive force obtained on a cryptographic chip circuit through electromagnetic induction. The generation of the induced electromotive force is the physical principle of implementing single bit flip by the electromagnetic fault injection method. The principle indicates that the magnitude of the electromotive force is unrelated to the fault injection time, and changing the fault injection time in the case that other conditions are determined will not affect the generation of the induced electromotive force, thereby not affecting the change of the logic value, that is, the fault injection effect.

S6: whether the fault injection is effective fault injection is determined after one-time fault injection is completed by the electromagnetic fault injection apparatus.

Specifically, when the incorrect ciphertext output by the cryptographic chip to be attacked under the fault injection is only caused by the inversion of a target bit, it is determined that the fault injection is the effective fault injection.

The target bit is a single bit. Exemplarily, the incorrect ciphertext output by the cryptographic chip to be attacked may be caused by multi-bit inversion, non-target bit inversion, bit skipping or a combination of multiple faults.

If the fault injection is the effective fault injection, an effective incorrect ciphertext output by the cryptographic chip to be attacked under the fault injection is recorded, otherwise, recording is skipped.

S7: the cryptographic chip to be attacked is initialized, and the electromagnetic fault injection apparatus is reset to change a plaintext input of the cryptographic chip to be attacked.

Exemplarily, when the input plaintext of the cryptographic chip to be attacked is changed, plaintexts can be input one by one by traversing from small to large.

S8: S2 is returned and re-performed until preset fault injection times are reached.

Specifically, when the step of setting the parameters of the electromagnetic fault injection apparatus by the upper computer is re-performed, for the same cryptographic chip to be attacked, the stepping speed and the moving step length of the XYZ-direction three-axis displacement platform are not required to change, and the intensity and frequency of the electromagnetic pulse signal generated by the electromagnetic pulse generator can be changed according to the actual situation. When the intensity of the electromagnetic pulse signal generated by the electromagnetic pulse generator changes, it is necessary to adaptively adjust the fault injection time.

S9: key information of the cryptographic chip to be attacked is cracked by a differential fault analysis method according to effective incorrect ciphertexts output by the cryptographic chip to be attacked under different plaintexts.

Specifically, a difference set is calculated according to a correct ciphertext output by the cryptographic chip to be attacked under a certain plaintext and an effective incorrect ciphertext output by the cryptographic chip to be attacked under the plaintext.

The above step is repeated to obtain all difference sets of the cryptographic chip to be attacked under different plaintexts.

An intersection is calculated according to all the difference sets.

The key information of the cryptographic chip to be attacked is determined according to the intersection.

The differential fault analysis (DFA) algorithm, as a mature technology, has been widely applied to the safety analysis and key cracking of the cryptographic chip. DFA can effectively infer an encrypted key by performing deep analysis on the ciphertext difference caused by a minor fault introduced in the encryption process. This technology uses the characteristic of significant change of the ciphertext caused by slight change of the plaintext in the encryption algorithm to gradually reveal the key information by comparing an output difference between a fault and a normal execution. Due to the extensive application and deep research of the DFA algorithm in the field of cryptanalysis, the theory and the practical method are quite mature, so the present application does not explain the DFA algorithm in detail.

Further, by calculating the ratio of the times m of the effective fault injection to the total times M of all fault injections, the success rate ISR(f) of the effective fault injection on the cryptographic chip to be attacked is obtained:

$$ISR(f)=m/M,$$

where the higher ISR(f), the more effective the fault injection. The cryptographic chip to be attacked can be evaluated by comprehensively cracking the total times of the fault injection used by the obtained key information of the cryptographic chip to be attacked and the success rate of the effective fault injection, that is, the more the total times of the fault injection used by the obtained key information of the cryptographic chip to be attacked and the lower the success rate of the effective fault injection, the higher the safety of the cryptographic chip to be attacked; otherwise, the lower the safety of the cryptographic chip to be attacked.

According to the present application, it is considered that the electromagnetic pulse signal cannot reach a peak value due to the rise time, the cryptographic chip to be attacked can be attacked only when the electromagnetic pulse signal reaches the peak value, and the rise slope and the rise time of the electromagnetic pulse signal are also different when the injection intensities of the electromagnetic pulse are different; therefore according to the present application, the fault injection time is adjusted jointly according to the peak time and the rise time of the electromagnetic pulse signal, so that the accuracy of the injection time is enhanced, the analysis efficiency and effect of the differential fault analysis are improved, and the success rate of the effective fault injection is increased; in addition, it is also considered that the electromagnetic pulse signal has the rise time and the fall time during continuous fault injection, the injection cycle is adjusted jointly according to the rise time, the fall time and the delay time, thereby further enhancing the accuracy of controlling the injection time, improving the analysis efficiency and effect of the differential fault analysis, and increasing the success rate of the effective fault injection.

Figure 5:
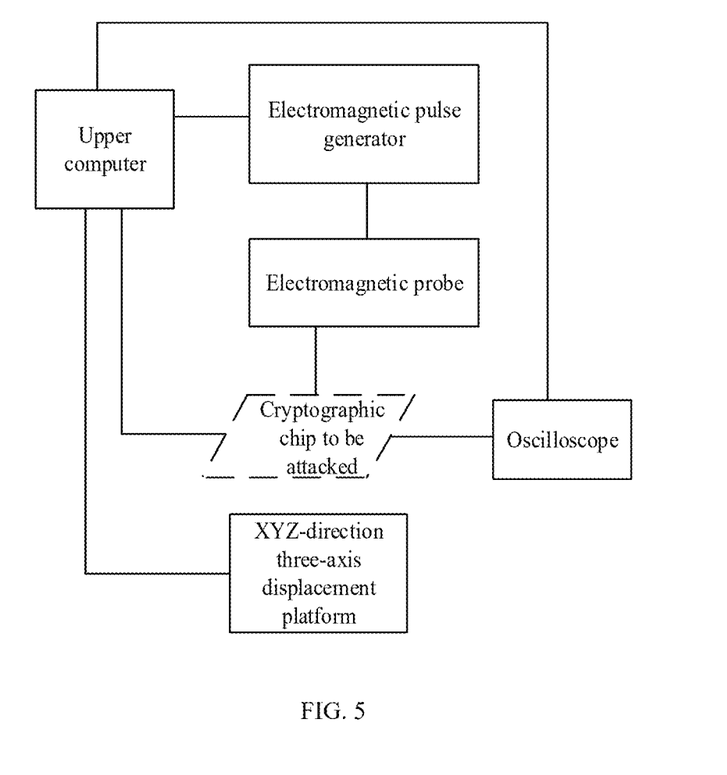
FIG. 5 is a structural schematic diagram of a high-temporal-accuracy electromagnetic fault injection apparatus for a cryptographic chip according to an embodiment of the present application.

FIG. 5 is a structural schematic diagram of a high-temporal-accuracy electromagnetic fault injection apparatus for a cryptographic chip according to an embodiment of the present application. The system is configured to perform the high-temporal-accuracy electromagnetic fault injection method for the cryptographic chip according to the above embodiment. As shown in FIG. 5, the electromagnetic fault injection apparatus includes:

an upper computer, configured to control and operate each device in the electromagnetic fault injection apparatus and communicate with a cryptographic chip to be attacked through a serial port, where exemplarily, the upper computer may be a computer;

an electromagnetic pulse generator, connected to the upper computer and configured to generate a pulse signal;

an electromagnetic probe, connected to the electromagnetic pulse generator and the cryptographic chip to be attacked and configured to generate a high-voltage transient electromagnetic field so as to generate transient induced voltage and current in the cryptographic chip to be attacked; and an XYZ-direction three-axis displacement platform, connected to the upper computer and configured to accurately adjust relative positions of the electromagnetic probe and the cryptographic chip to be attacked.

Further, the electromagnetic fault injection apparatus further includes:

an oscilloscope, connected to the upper computer and the cryptographic chip to be attacked, and configured to detect an electromagnetic signal of the cryptographic chip to be attacked, monitor a fault injection time point and detect a waveform fluctuation of the cryptographic chip to be attacked so as to preliminarily determine whether fault injection is completed successfully.

It should be noted that the terms used in the present application are merely for describing specific embodiments, rather than limiting the embodiments of the present application. As shown in the specification of the present application, unless the context clearly suggests an exception, the words such as "a", "an", "one" and/or "the" do not refer to the singular, or may include the plural. The terms "including", "comprising" or other variations thereof are intended to cover non-exclusive inclusion, so that a process, method or device including a series of elements not only includes those elements, but also includes other elements not explicitly listed, or further includes elements inherent to such process, method or device. In the absence of more limitations, an element defined by "include a . . . " does not exclude other same elements existing in the process, method or device including the element.

It should be further noted that orientations or positional relationships indicated by terms, such as "center", "upper", "lower", "left", "right", "vertical", "horizontal", "inner", "outer" and the like are based on orientations or positional relationships shown in the drawings, are to facilitate the description of the present application and simplify the description merely, do not indicate or imply that the referred apparatuses or elements must have specific orientations and are constructed and operated in the specific orientations and thus should not be construed to limit the present application. Unless otherwise clearly specified and defined, the terms "mount", "interconnect" and "connect" should be understood in their broad sense. For example, the terms may be "fixedly connect", "detachably connect" or "integrally connect"; "mechanically connect" and "electrically connect"; or "directly interconnect", "indirectly interconnect through an intermediate" or "the communication between the interiors of two elements". For those of ordinary skill in the art, the specific meanings of the above terms in the present application may be understood according to specific situations.

Finally, it should be noted that: the above embodiments are merely used for illustrating the technical solutions of the present application, but do not limit them; although the present application has been described in detail with reference to the foregoing examples, those of ordinary skills in the art should understand that: the technical solutions recorded in the foregoing embodiments may still be modified, or some of the technical features therein may be equivalently substituted; however, these modifications or substitutions do not separate the essence of the corresponding technical solutions from the spirit and scope of the technical solutions of the embodiments of the present application.

What is claimed is:

1. A high-temporal-accuracy electromagnetic fault injection method for a cryptographic chip, being implemented based on an electromagnetic fault injection apparatus, the electromagnetic fault injection apparatus comprising an upper computer, an XYZ-direction three-axis displacement platform, an electromagnetic pulse generator and an electromagnetic probe, and the method comprising the following steps:

placing a cryptographic chip to be attacked on the XYZ-direction three-axis displacement platform;

setting parameters of the electromagnetic fault injection apparatus by the upper computer, wherein the parameters comprise an intensity and a frequency of an electromagnetic pulse signal generated by the electromagnetic pulse generator, and a stepping speed and a moving step length of the XYZ-direction three-axis displacement platform;

performing initialization on the cryptographic chip to be attacked by the upper computer, wherein the initialization comprises power-on and plaintext input;

determining a fault injection time of the electromagnetic fault injection apparatus according to a peak time and a rise time of the electromagnetic pulse signal generated by the electromagnetic pulse generator;

controlling the electromagnetic fault injection apparatus at the fault injection time to perform fault injection on a target position of the cryptographic chip to be attacked, wherein the fault injection performed on the cryptographic chip to be attacked comprises a single fault injection and a continuous fault injection;

determining whether the fault injection is an effective fault injection after completing one-time fault injection by the electromagnetic fault injection apparatus; if the fault injection is the effective fault injection, recording an effective incorrect ciphertext output by the cryptographic chip to be attacked under the fault injection, otherwise, skipping recording;

initializing the cryptographic chip to be attacked, and resetting the electromagnetic fault injection apparatus to change a plaintext input of the cryptographic chip to be attacked;

returning to the step of setting the parameters of the electromagnetic fault injection apparatus by the upper computer and re-performing the step until preset fault injection times are reached; and cracking key information of the cryptographic chip to be attacked by a differential fault analysis method according to effective incorrect ciphertexts output by the cryptographic chip to be attacked under different plaintexts.

2. The high-temporal-accuracy electromagnetic fault injection method for the cryptographic chip according to claim 1, wherein the placing a cryptographic chip to be attacked on the XYZ-direction three-axis displacement platform comprises:

when the cryptographic chip to be attacked is a smart card chip, placing the smart card chip with the back upward on the XYZ-direction three-axis displacement platform of the electromagnetic fault injection apparatus; and when the cryptographic chip to be attacked is an embedded chip, placing the embedded chip with the front upward on the XYZ-direction three-axis displacement platform of the electromagnetic fault injection apparatus.

3. The high-temporal-accuracy electromagnetic fault injection method for the cryptographic chip according to claim 1, wherein the determining fault injection time of the electromagnetic fault injection apparatus according to peak time and rise time of the electromagnetic pulse signal generated by the electromagnetic pulse generator comprises:

determining an intensity of the electromagnetic pulse signal generated by the electromagnetic pulse generator;

determining the peak time of the electromagnetic pulse signal according to a moment when a trigger signal is pulled up in the last round of encryption operation of the cryptographic chip to be attacked, and determining the rise time of the electromagnetic pulse signal according to the intensity of the electromagnetic pulse signal; and determining the fault injection time of the electromagnetic fault injection apparatus according to a difference between the peak time and the rise time of the electromagnetic pulse signal.

4. The high-temporal-accuracy electromagnetic fault injection method for the cryptographic chip according to claim 3, wherein when the fault injection performed by the cryptographic chip to be attacked is the continuous fault injection, after the determining fault injection time of the electromagnetic fault injection apparatus according to peak time and rise time of the electromagnetic pulse signal generated by the electromagnetic pulse generator, the method further comprises:

determining fall time of the electromagnetic pulse signal according to the intensity of the electromagnetic pulse signal; and determining an injection cycle of the continuous fault injection according to the rise time, the fall time and preset delay time of the electromagnetic pulse signal, the injection cycle being the sum of the rise time, the fall time and the preset delay time of the electromagnetic pulse signal.

5. The high-temporal-accuracy electromagnetic fault injection method for the cryptographic chip according to claim 1, wherein after the performing initialization on the cryptographic chip to be attacked by the upper computer, the method further comprises:

obtaining a correct ciphertext output by the cryptographic chip to be attacked.

6. The high-temporal-accuracy electromagnetic fault injection method for the cryptographic chip according to claim 5, wherein the determining whether the fault injection is effective fault injection after completing one-time fault injection by the electromagnetic fault injection apparatus comprises:

when the incorrect ciphertext output by the cryptographic chip to be attacked under the fault injection is only caused by the inversion of a target bit, determining that the fault injection is the effective fault injection.

7. The high-temporal-accuracy electromagnetic fault injection method for the cryptographic chip according to claim 6, wherein the cracking key information of the cryptographic chip to be attacked by a differential fault analysis method according to effective incorrect ciphertexts output by the cryptographic chip to be attacked under different plaintexts comprises:

calculating a difference set according to a correct ciphertext output by the cryptographic chip to be attacked under a certain plaintext and an effective incorrect ciphertext output by the cryptographic chip to be attacked under the plaintext;

repeating the above step to obtain all difference sets of the cryptographic chip to be attacked under different plaintexts;

calculating an intersection according to all the difference sets; and determining the key information of the cryptographic chip to be attacked according to the intersection.

8. The high-temporal-accuracy electromagnetic fault injection method for the cryptographic chip according to claim 1, wherein in the step of controlling the electromagnetic fault injection apparatus at the fault injection time to perform fault injection on a target position of the cryptographic chip to be attacked, a method for determining the target position comprises:

performing an electromagnetic sensitivity test on the cryptographic chip to be attacked to obtain an electromagnetic sensitivity of each position on the cryptographic chip to be attacked; and selecting the position corresponding to a maximum electromagnetic sensitivity as the target position of the cryptographic chip to be attacked.

9. A high-temporal-accuracy electromagnetic fault injection apparatus for a cryptographic chip, for implementing the high-temporal-accuracy electromagnetic fault injection method for the cryptographic chip according to claim 1, comprising:

the upper computer configured to control and operate each device in the electromagnetic fault injection apparatus and communicate with a cryptographic chip to be attacked through a serial port;

the electromagnetic pulse generator connected to the upper computer and configured to generate a pulse signal;

the electromagnetic probe connected to the electromagnetic pulse generator and the cryptographic chip to be attacked and configured to generate a high-voltage transient electromagnetic field so as to generate transient induced voltage and current in the cryptographic chip to be attacked; and the XYZ-direction three-axis displacement platform connected to the upper computer and configured to adjust relative positions of the electromagnetic probe and the cryptographic chip to be attacked.

10. The high-temporal-accuracy electromagnetic fault injection apparatus for the cryptographic chip according to claim 9, further comprising:

an oscilloscope connected to the upper computer and the cryptographic chip to be attacked, and configured to detect an electromagnetic signal of the cryptographic chip to be attacked, monitor a fault injection time point and detect a waveform fluctuation of the cryptographic chip to be attacked so as to determine whether fault injection is completed successfully.

* * * * *